(12) United States Patent
Dollinger et al.

(10) Patent No.: US 9,979,338 B2
(45) Date of Patent: May 22, 2018

(54) ALTERNATOR CONTROL SYSTEM FOR A PLANTER

(71) Applicant: CNH Industrial America LLC, New Holland, PA (US)

(72) Inventors: Tyson J. Dollinger, Mazon, IL (US); David Schulte, Woodridge, IL (US); Robert Longua, Palatine, IL (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 14/755,013

(22) Filed: Jun. 30, 2015

(65) Prior Publication Data
US 2017/0000009 A1    Jan. 5, 2017

(51) Int. Cl.
| | |
|---|---|
| *A01B 71/02* | (2006.01) |
| *F15B 15/18* | (2006.01) |
| *H02P 9/04* | (2006.01) |
| *A01B 79/00* | (2006.01) |
| *A01B 73/06* | (2006.01) |
| *A01C 7/08* | (2006.01) |
| *A01C 21/00* | (2006.01) |
| *A01C 14/00* | (2006.01) |

(52) U.S. Cl.
CPC ............... *H02P 9/04* (2013.01); *A01B 73/06* (2013.01); *A01B 79/00* (2013.01); *A01C 7/08* (2013.01); *A01C 14/00* (2013.01); *A01C 21/00* (2013.01)

(58) Field of Classification Search
CPC ......... A01C 21/00; A01B 79/00; A01B 73/06; A01B 71/02
USPC ............. 701/26, 50; 700/114, 275; 172/1, 2, 172/430, 663; 111/185, 200
See application file for complete search history.

(56) References Cited

U.S. PATENT DOCUMENTS

| | | | |
|---|---|---|---|
| 2,955,210 | A | 2/1958 | Dean et al. |
| 3,641,416 | A | 2/1972 | Riff |
| 3,677,348 | A | 7/1972 | Boetto et al. |
| 3,683,255 | A | 8/1972 | Schroeder |
| 4,085,862 | A | 4/1978 | Steffen |
| 4,744,285 | A | 5/1988 | Presley |
| 5,875,630 | A | 3/1999 | Walsh et al. |
| 6,394,206 | B1 | 5/2002 | Fury |

(Continued)

FOREIGN PATENT DOCUMENTS

| | | |
|---|---|---|
| EP | 0 570 754 A1 | 5/1993 |
| WO | 01/20770 A1 | 3/2001 |

(Continued)

*Primary Examiner* — Thomas G Black
*Assistant Examiner* — Wae L Louie
(74) *Attorney, Agent, or Firm* — Rebecca L. Henkel; Rickard K. DeMille

(57) ABSTRACT

An agricultural vehicle system including a towing vehicle and an implement towed by the towing vehicle. The towing vehicle supplying pressurized hydraulic fluid to the implement. The implement includes a chassis, an electrical generation device carried by the chassis and a hydraulic flow control system. The electrical generation device has a hydraulically driven motor coupled to the pressurized hydraulic fluid. The hydraulic flow control system is configured to alter a flow of the hydraulic fluid to the motor and to maintain a speed of the motor, with the speed being dependent upon a configuration input defining a configuration of the implement to which the electrical generation device is coupled.

18 Claims, 3 Drawing Sheets

(56) References Cited

U.S. PATENT DOCUMENTS

| | | |
|---|---|---|
| 6,407,465 B1 | 6/2002 | Peltz et al. |
| 6,568,493 B2 | 5/2003 | Parkert et al. |
| 6,666,022 B1 | 12/2003 | Yoshimatsu et al. |
| 6,748,737 B2 | 6/2004 | Lafferty |
| 6,945,039 B2 | 9/2005 | Yoshino |
| 7,053,498 B1 | 5/2006 | Boisvert et al. |
| 7,459,800 B2 | 12/2008 | Boisvert et al. |
| 7,747,370 B2 | 6/2010 | Dix |
| 7,759,811 B2 | 7/2010 | Boisvert et al. |
| 8,080,888 B1 | 12/2011 | Daley |
| 8,261,865 B2 | 9/2012 | Stansbury, III |
| 8,269,359 B2 | 9/2012 | Boisvert et al. |
| 8,269,360 B2 | 9/2012 | Boisvert et al. |
| 8,288,880 B2 | 10/2012 | Olsen et al. |
| 8,358,019 B2 | 1/2013 | Lemus |
| 8,362,629 B2 | 1/2013 | Weber et al. |
| 2007/0251736 A1 | 11/2007 | Bermann et al. |
| 2007/0284165 A1 | 12/2007 | Patterson |
| 2008/0083222 A1 | 4/2008 | Hubert |
| 2011/0259618 A1 | 10/2011 | Zielke et al. |
| 2013/0061589 A1 | 3/2013 | Bauer et al. |
| 2013/0140822 A1 | 6/2013 | Saposnik |
| 2014/0225374 A1 | 8/2014 | Collett et al. |
| 2014/0277675 A1* | 9/2014 | Anderson ............... G05B 15/02 700/114 |
| 2014/0277959 A1* | 9/2014 | Wagers ................. A01C 21/005 701/50 |
| 2014/0291045 A1 | 10/2014 | Collett et al. |
| 2015/0128834 A1* | 5/2015 | Beck ...................... A01B 59/00 111/200 |
| 2015/0163992 A1* | 6/2015 | Anderson ............ A01C 21/005 701/50 |
| 2015/0168089 A1* | 6/2015 | Brinkley ................. F28F 27/02 165/11.1 |
| 2015/0208571 A1* | 7/2015 | Hahn .................... F15B 15/202 172/1 |
| 2015/0319913 A1* | 11/2015 | Foster ................... A01B 69/00 701/26 |
| 2016/0135356 A1* | 5/2016 | Prickel ................. A01B 73/065 172/2 |
| 2016/0165789 A1* | 6/2016 | Gervais ................. A01C 7/105 700/275 |
| 2016/0165794 A1* | 6/2016 | Czapka ............... A01C 21/005 111/185 |
| 2016/0227700 A1* | 8/2016 | Wendte .................. A01C 7/20 |
| 2017/0000009 A1* | 1/2017 | Dollinger ................. H02P 9/04 |

FOREIGN PATENT DOCUMENTS

| | | |
|---|---|---|
| WO | 2009/141668 A1 | 11/2009 |
| WO | 2012/123722 A2 | 9/2012 |

* cited by examiner

ALTERNATOR CONTROL SYSTEM FOR A PLANTER

BACKGROUND OF THE INVENTION

1. Field of the Invention

The present invention relates to agricultural planters, and, more particularly, to electrical generation systems associated with agricultural planters.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed-metering device provides individual seeds at a controlled rate for deposit in the seed trench. Furrow closing components of each row unit close the seed trench in a controlled manner.

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, also called an opening disc, cuts into the soil and rotates, dislocating soil as it rotates to form the trench.

Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, at least one pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

One issue that arises with the planters is matching electrical generation with electrical needs of the planter as it is in differing modes of operation.

What is needed in the art is a planter electrical system that is adaptive to the needs of the specific planter and the operation of the systems thereon.

SUMMARY OF THE INVENTION

The present invention provides an adaptive electrical system for a planter.

The invention in one form is directed to an agricultural vehicle system including a towing vehicle and an implement towed by the towing vehicle. The towing vehicle supplying pressurized hydraulic fluid to the implement. The implement includes a chassis, an electrical generation device carried by the chassis and a hydraulic flow control system. The electrical generation device has a hydraulically driven motor coupled to the pressurized hydraulic fluid. The hydraulic flow control system is configured to alter a flow of the hydraulic fluid to the motor and to maintain a speed of the motor, with the speed being dependent upon a configuration input defining a configuration of the implement to which the electrical generation device is coupled.

The invention in another form is directed to an agricultural implement to be towed by a towing vehicle supplying pressurized hydraulic fluid to the implement. The agricultural implement includes a chassis, an electrical generation device carried by the chassis and a hydraulic flow control system. The electrical generation device has a hydraulically driven motor coupled to the pressurized hydraulic fluid. The hydraulic flow control system is configured to alter a flow of the hydraulic fluid to the motor and to maintain a speed of the motor, with the speed being dependent upon a configuration input defining a configuration of the implement to which the electrical generation device is coupled.

The invention in yet another form is directed to a method of controlling an electrical generator coupled to an implement capable of being towed by a towing vehicle. The method includes the steps of supplying pressurized hydraulic fluid to the implement; hydraulically driving a motor using the pressurized hydraulic fluid, the motor being coupled to an electrical generation device carried by the implement; and controlling a flow of the hydraulic fluid to the motor and to maintain a speed of the motor, the speed being dependent upon a configuration input defining a configuration of the implement to which the electrical generation device is coupled.

An advantage of the present invention is that it is adaptive to the configuration and speed of the planter.

Another advantage is that the hydraulic fluid becomes available for the lift system when not needed to generate electricity.

Yet another advantage is the speed of the planting operation alters the electrical needs of the planter and are compensated for by the present invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a state diagram illustrating differing states that the electrical generation system of FIGS. 1 and 2 transitions through.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
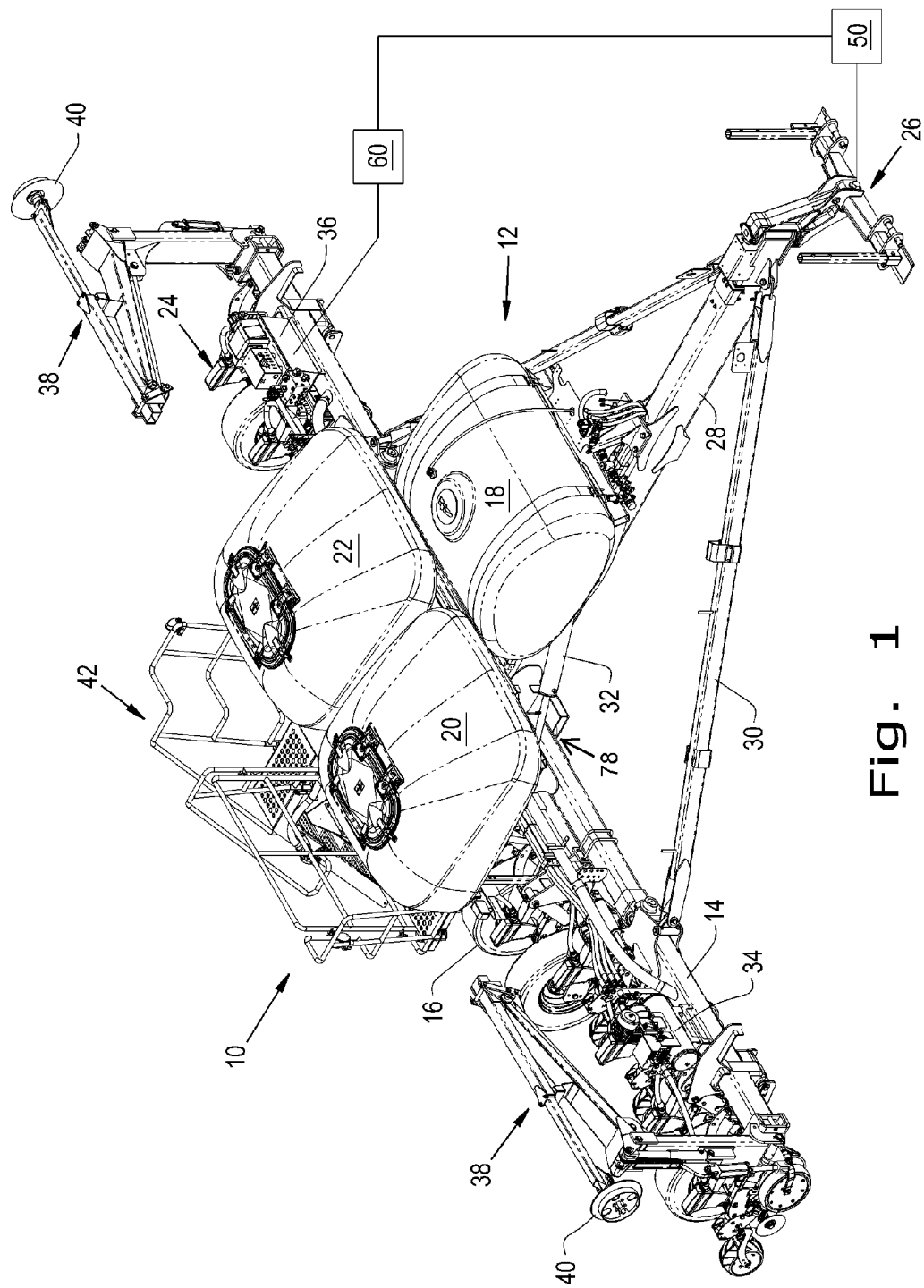
FIG. 1 is a perspective view of an agricultural implement in the form of a planter having an embodiment of an electrical generation system of the present invention attached thereto.

Referring now to the drawings, and more particularly to FIG. 1, there is shown an embodiment of an agricultural planter 10 according to the present invention which generally includes a chassis 12 forming a support structure for components of the planter 10 that can be formed by a hitch assembly at a front of the planter 10 connected to a tool bar 14, main wheels 16 carried by the chassis near a rear of the planter 10, one or more storage tanks 18, 20, and 22 that can be filled with seed or other agriculture material carried by the chassis, and a plurality of row units 24 connected to the tool bar 14 and arranged laterally across a length of the tool bar 14 so that they are carried by the chassis. The chassis 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow for an operator to access the storage tanks 20, 22.

Figure 2:
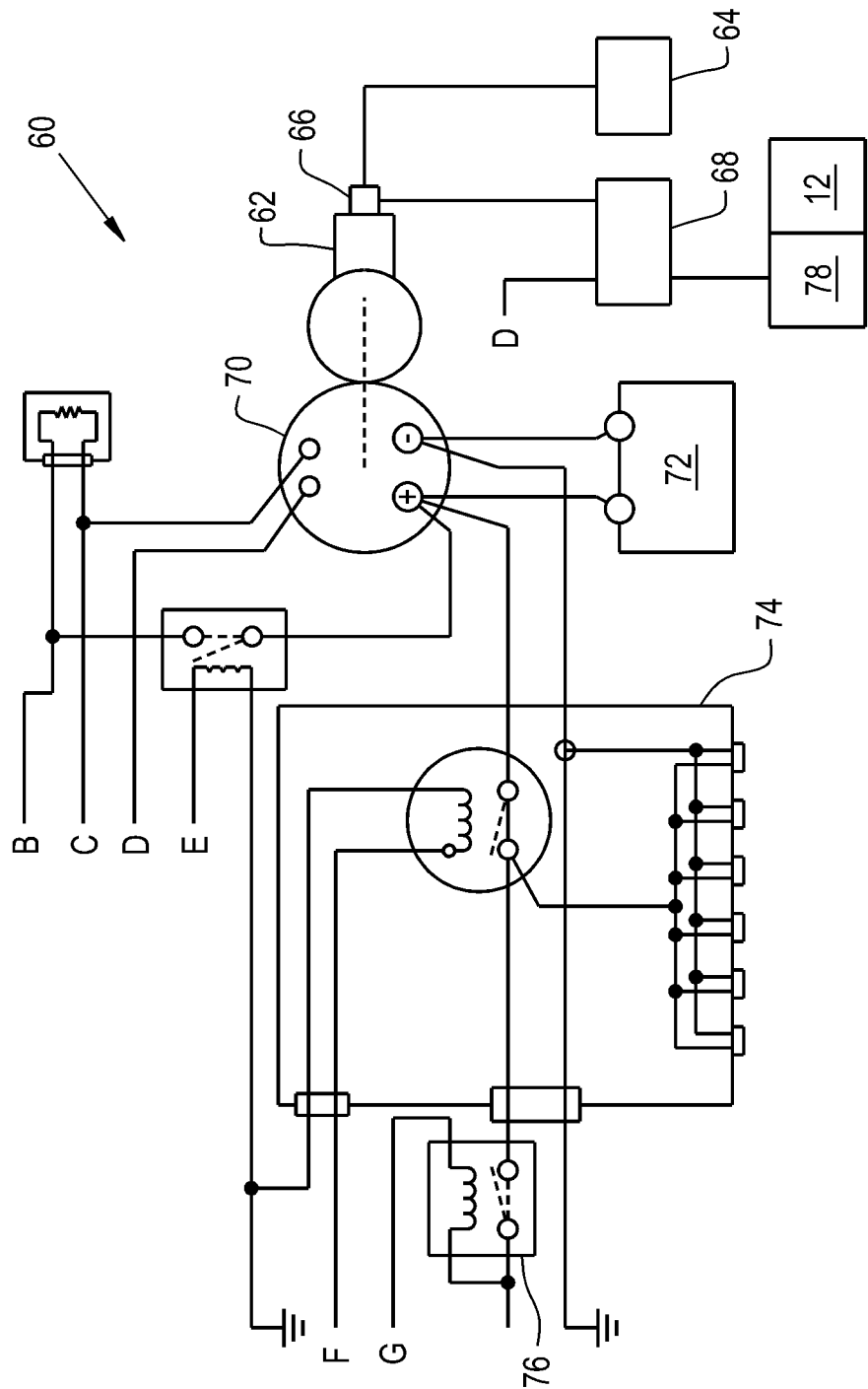
FIG. 2 is a schematic representation of the electrical generation system of FIG. 1.

Now, additionally referring to FIG. 2 there is shown a schematic representation of an electrical generation device 60 that is carried by chassis 12 and is supplied pressurized hydraulic fluid from a towing vehicle 50, which may be a tractor 50. Electrical generation device 60 includes a hydraulically driven motor 62, which receives the hydraulic fluid from a fluid source 64, which for the purpose of discussion is part of tractor 50. Electrical generation device 60 also includes a control valve 66, a hydraulic flow control system 68, an alternator 70, a battery 72, and a power module 74.

Alternator 70 is driven by motor 62 and the speed of motor 62 (and hence alternator 70) is controlled by control system 68. The alternator field voltage output is available on line C and is used as an indication that alternator 70 is functioning correctly. The alternator field excite relay is controlled by the coil of the relay coupled to line E, and when the relay is conducting the battery voltage is present on line B. The speed of the alternator is available on line D, which may be determined by the frequency of the voltage being generated, and is also available to control system 68 so that the speed of alternator 70 can be monitored and the hydraulic fluid flow through control valve 66 is altered by control system 68 to maintain a preselected speed for alternator 70.

Line G is coupled to the coil of a normally open relay 76 so that an outside source, depicted here as power from a tractor can be connected to control the electrical systems of planter 10 illustrated as a series of connections along the bottom of power module 74. Line F is coupled to the coil of a normally open relay in power module 74. Once the alternator 70 is operating, the relay in the power module 74 is energized and the tractor power relay 76 is de-energized. Power is then supplied to the electrical systems of planter 10 from alternator 70 through the power connections along the bottom of power module 74.

A predefined configuration is put into hydraulic flow control system 68 that is reflective of the configuration of planter 10, which can be a model number and the elements that are optionally installed on planter 10. Based on this information a speed value for alternator 70 is looked up so that the electrical needs of planter 10 can be met. Control system 68 monitors the planter speed and adjusts the speed of alternator 70. Control system 68 receives the alternator speed feedback signal on line D and adjusts control valve 66 so that the speed signal on line D approximates the desired speed value. For example, here is shown differing model number planters that have differing features thereon and the desired speed of alternator 70 is shown as an entry in the table.

TABLE 1

Showing the desired alternator speed based on model, configuration and planter speed.

| Planter model ID | Basic Planter Electronics | Optional Electronics | Electric Motors Speed <= 6 mph | Electric Motors Speed > 6 mph |
|---|---|---|---|---|
| AA | 2,000 rpm | 2,000 rpm | 2,000 rpm | 2,000 rpm |
| BB | 2,000 rpm | 2,000 rpm | 2,000 rpm | 2,500 rpm |
| CC | 2,000 rpm | 2,000 rpm | 2,500 rpm | 5,000 rpm |
| DD | 2,000 rpm | 2,000 rpm | 2,800 rpm | 5,000 rpm |

In Table 1, when the planter has an ID of AA the selected speed of alternator 70 is 2,000 rpm regardless of other factors. Also, regardless of ID, if only basic and optional electronics are installed then the speed of alternator 70 is 2,000 rpm. With an ID of BB then the speed of alternator 70 is 2,000 rpm, until planter 10 exceeds the speed of 6 mph, then the speed of alternator 70 is changed to 2,500 rpm to meet the increased electrical power needs of the electric motors on planter 10 at a higher planting speed. When ID CC is selected, then when the electric motors are activated, the speed of alternator 70 is increased to 2,500 rpm until planter 10 exceeds 6 mph, then the speed is increased to 5,000 rpm. In a similar manner with Planter model ID DD, the speeds of the electric motors are 2,800 and 5,000 rpm dependent upon the speed of planter 10.

Figure 3:
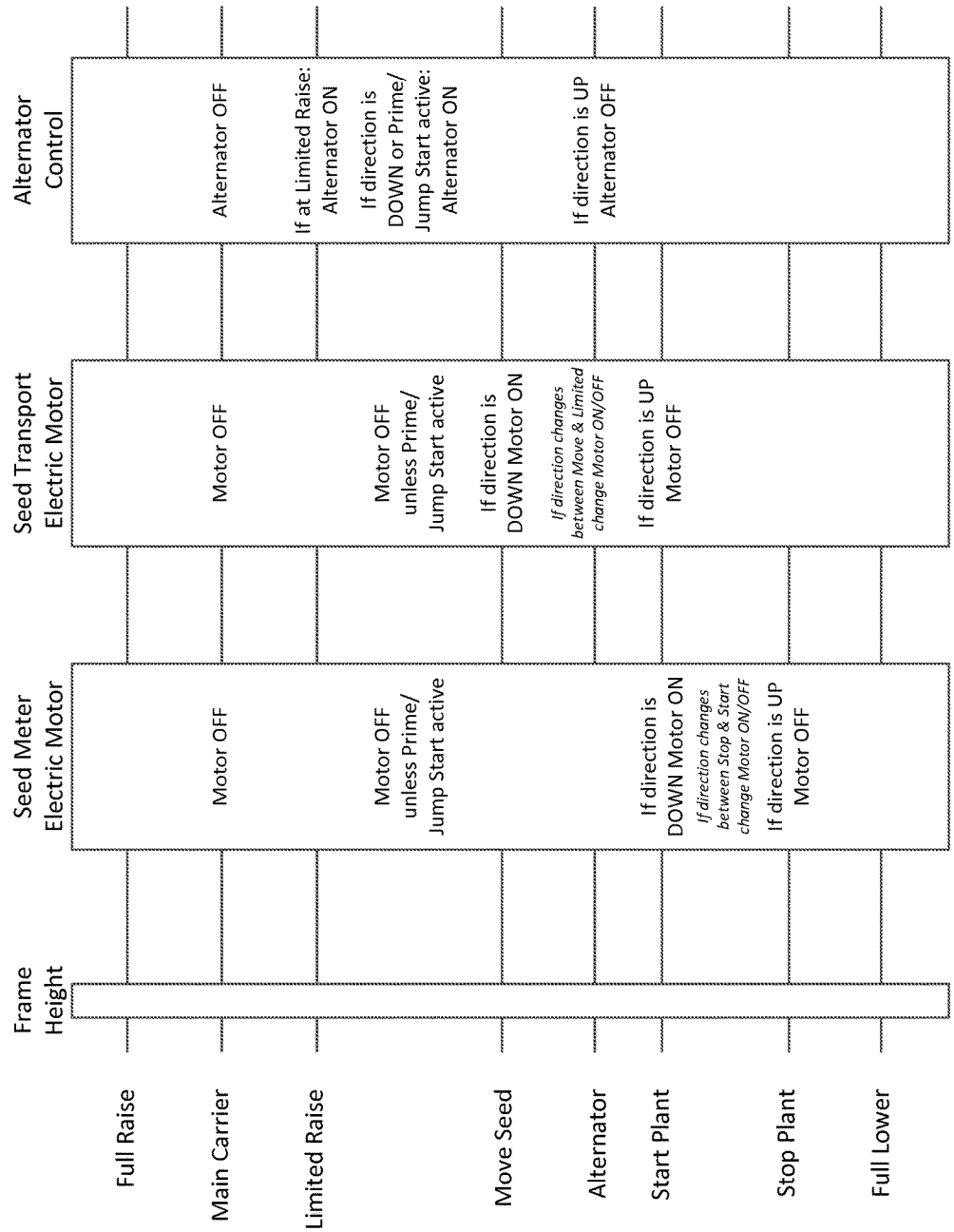

Now, additionally referring to FIG. 3, there is illustrated a state table for various aspects of the systems that can be part of planter 10, depending upon the configuration of planter 10, and further showing how active the systems are when planter 10 is in different modes, as depicted along the left side of the state table, which can relate to the position of chassis 12, as in fully raised, limited raise, in a carrier position or in full lowered position.

Relative to alternator 70, when planter 10 is in a chassis raising mode the alternator 70 is stopped so that the hydraulic fluid can be used to raise the planter in a more efficient manner. This raising action is an end of row detection event by a frame height sensor 78 coupled to chassis 12. Alternator 70 may then be activated when chassis 12 is fully raised and the hydraulic flow is no longer needed to raise chassis 12. Also, alternator 70 may be kept off while chassis 12 is raised, until a lowering of chassis 12 is detected by sensor 78, as a starting event, and then alternator 70 is activated to the speed as determined by table 1. It is also contemplated that battery 72 can supply the electrical needs of the electrical systems when chassis 12 is raised, and further that the state of battery 72 can be monitored and if it is being depleted that alternator 70 can be activated.

The present invention advantageously allows a single version of electrical generation system 60 to be put on various planter types and the electrical output be altered by the model, configuration of the model, and the speed of planting. Additionally the present invention detects an end of row event, or a stop planting mode, and react by shutting down the alternator so that the hydraulic flow can be used to lift planter 10 for a faster lift operation. Alternator 70 is then activated when a starting event, such as the lowering of chassis 12 is detected.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle system, comprising:
   a towing vehicle; and
   an implement towed by said towing vehicle, said towing vehicle supplying pressurized hydraulic fluid to said implement, said implement including:
      a chassis;
      an electrical generation system carried by said chassis, said electrical generation system including an alternator and a battery which together operate to supply electrical power to the implement via a hydraulically driven motor coupled to the alternator and coupled to the pressurized hydraulic fluid, and a hydraulic flow control system configured to alter a flow of the hydraulic fluid to said hydraulic motor and to maintain a speed of said hydraulic motor and a speed of the alternator, said alternator speed being dependent upon a configuration input defining a configuration of the implement to which the electrical generation system is coupled,
   wherein the hydraulic motor drives the alternator, and the alternator and battery supply all required electrical energy to the implement when the implement is in the working mode, and
   wherein when in the working mode, the alternator is turned off and the battery is used to provide electrical power to the implement when a portion of the chassis is hydraulically lifted.

2. The agricultural vehicle system of claim 1, further comprising an event sensor configured to detect an end of row event, said hydraulic flow control system being configured to substantially stop the flow of the hydraulic fluid to said hydraulic motor of the implement when the end of row event is detected.

3. The agricultural vehicle system of claim 2, wherein the end of row event that is detected is a raising of the portion of the chassis of the implement.

4. The agricultural vehicle system of claim 1, wherein said hydraulic flow control system is additionally configured to increase said alternator speed upon a detection of a planting speed that exceeds a predetermined value.

5. The agricultural vehicle system of claim 2, wherein said hydraulic flow control system is further configured to start the flow of the hydraulic fluid to said hydraulic motor when a starting event is detected.

6. The agricultural vehicle system of claim 5, wherein the starting event is a detecting of a lowering of the portion of said chassis.

7. The agricultural vehicle system of claim 1, wherein the configuration of the implement includes an electric motor, and the alternator speed is increased to drive the electric motor.

8. The agricultural vehicle system of claim 1, wherein the implement is a planter implement including a number of row units coupled to said chassis.

9. The agricultural vehicle system of claim 1, wherein the alternator speed is increased when the agricultural vehicle system travels faster than six miles per hour.

10. An agricultural implement to be towed by a towing vehicle supplying pressurized hydraulic fluid to the implement, the agricultural implement comprising:
    a chassis;
    an electrical generation system carried by said chassis, said electrical generation system including an alternator and a battery which together operate to supply electrical power to the agricultural implement via a hydraulically driven motor coupled to the alternator and coupled to the pressurized hydraulic fluid, and a hydraulic flow control system configured to alter a flow of the hydraulic fluid to said hydraulic motor and to maintain a speed of said hydraulic motor and a speed of the alternator, said alternator speed being dependent upon a configuration input defining a configuration of the implement to which the electrical generation system is coupled,
    wherein the hydraulic motor drives the alternator, and the alternator and battery supply all required electrical energy to the agricultural implement when the agricultural implement is in the working mode, and
    wherein when in the working mode, the alternator is turned off and the battery is used to provide electrical power to the agricultural implement when a portion of the chassis is hydraulically lifted.

11. The agricultural implement of claim 10, further comprising an event sensor configured to detect an end of row event, said hydraulic flow control system being configured to substantially stop the flow of the hydraulic fluid to said hydraulic motor of the agricultural implement when the end of row event is detected.

12. The agricultural implement of claim 11, wherein the end of row event that is detected is a raising of the portion of the chassis of the agricultural implement.

13. The agricultural implement of claim 12, wherein said event sensor is a proximity sensor configured to sense a movement of said chassis.

14. The agricultural implement of claim 11, wherein said hydraulic flow control system is further configured to start the flow of the hydraulic fluid to said hydraulic motor when a starting event is detected.

15. The agricultural implement of claim 14, wherein the starting event is a detecting of a lowering of the portion of said chassis.

16. The agricultural implement of claim 10, wherein the configuration of the implement includes an electric motor, and the alternator speed is increased to drive the electric motor.

17. The agricultural implement of claim 10, wherein the agricultural implement is a planter implement including a number of row units coupled to said chassis.

18. The agricultural implement of claim 10, wherein the alternator speed is increased when the agricultural implement travels faster than six miles per hour.

\* \* \* \* \*